United States Patent [19]

Nagamatsu

[11] Patent Number: 5,475,604
[45] Date of Patent: Dec. 12, 1995

[54] PALLET CARRY-IN MANAGEMENT SYSTEM FOR STOREHOUSE

[75] Inventor: Eiji Nagamatsu, Kanagawa, Japan

[73] Assignee: Amada Metrecs Company, Limited, Kanagawa, Japan

[21] Appl. No.: 278,094

[22] Filed: Jul. 21, 1994

[51] Int. Cl.⁶ .............................. G06F 17/00; B65G 1/20
[52] U.S. Cl. ........................................ 364/478; 414/788.9
[58] Field of Search .................................. 364/478, 562, 364/131, 138; 414/788.1, 788.9, 331

[56] References Cited

U.S. PATENT DOCUMENTS

| | | | |
|---|---|---|---|
| 3,770,147 | 11/1973 | Kito et al. | 414/282 |
| 3,844,423 | 10/1974 | Loomer et al. | 414/795.3 |
| 4,133,436 | 1/1979 | Dahm | 414/285 |
| 4,787,804 | 11/1988 | Edenäs | 414/281 |
| 5,002,458 | 3/1991 | Moltrasio | 414/792.1 |
| 5,310,396 | 5/1994 | Momoi et al. | 483/15 |

FOREIGN PATENT DOCUMENTS

| | | |
|---|---|---|
| 4233688 | 4/1994 | Germany . |
| 61-51401 | 3/1986 | Japan . |
| 3216403 | 9/1991 | Japan . |
| 4164704 | 6/1992 | Japan . |
| 4-70810 | 6/1992 | Japan . |
| 9407776 | 4/1994 | WIPO . |

OTHER PUBLICATIONS

English Language Abstract of JP 3–216403, Sep. 1991.
English Language Abstract of JP 4–164704, Jun. 1992.
Abstract of Japanese Patent No. 61–51401, Mar. 1986.

*Primary Examiner*—Paul P. Gordon
*Attorney, Agent, or Firm*—Sandler, Greenblum & Bernstein

[57] ABSTRACT

To store tall loads on a pallet (P) supported by the pallet retaining shelves (R) of a shelf frame (3), irrespective of a pitch dimension between the pallet supporting shelf crosspieces (13), the pallet carry-in management system includes: a pallet presence/absence state management section (57) for managing pallet presence or absence status of the respective pallet retaining shelves (R); a vertically continuous vacant shelf management section (59) for managing a position and the number of stages of the vacant pallet retaining shelves (R) on which no pallets are carried-in vertically continuously, on the basis of management information transmitted by the pallet presence/absence state management section; and a maximum allowable load height calculating section (61) for calculating an maximum allowable height of loads to be mounted on the vacant pallet retaining shelves (R), on the basis of the position and number of stages of the vacant pallet retaining shelf information transmitted by the vertically continuous vacant shelf management section, in order to carry-in the pallet, on which loads whose height extends to a plurality of stages of the pallet retaining shelves can be mounted, on a lowermost pallet retaining shelf of the vertically continuous vacant shelves, on the basis of the vertically continuous vacant shelf information given by the vertically continuous vacant pallet retaining shelf management section and the maximum allowable load height information given by the maximum allowable load height calculating section.

2 Claims, 4 Drawing Sheets

PALLET CARRY-IN MANAGEMENT SYSTEM FOR STOREHOUSE

BACKGROUND OF THE INVENTION

1. Field of the Invention

The present invention relates to a pallet carry-in management system for a three-dimensional storehouse, and more specifically to the pallet carry-in management system for a three-dimensional storehouse in which a plurality of pallets are separately carried-in or -out of pallet retaining shelves supported at a plurality of upper and lower stages by pallet supporting shelf crosspieces positioned on both sides of the shelves in a shelf frame.

2. Description of the Related Art

As a three-dimensional storehouse for storing various goods (loads) carried by pallets automatically under control of a computer, there is known such a structure that a plurality of pallet retaining shelves are supported at plural vertical stages by pallet supporting crosspieces located on both sides of the shelves in a shelf frame.

In the conventional three-dimensional storehouse, since the maximum allowable height of the loads to be mounted on the pallet is fixedly determined on the basis of one-pitch dimension between the pallet supporting crosspieces and therefore limited thereby, it is impossible to store tall goods higher than the one-pitch dimension. Therefore, when tall goods are to be stored, it has been necessary to previously increase the pitch between the pallet supporting shelf crosspieces. In the case where the one pitch between the pallet supporting shelf crosspieces is determined to be large, since the number of stages of the pallet retaining shelves is reduced, there arises a problem in that the storing efficiency of the three-dimensional storehouse is lowered and thus the space availability is decreased.

SUMMARY OF THE INVENTION

With these problems in mind, therefore, it is the object of the present invention to provide a pallet carry-in management system for a three-dimensional storehouse, which can store any tall goods by releasing the maximum allowable height of goods mounted on the pallet, that is, without being limited to the one-pitch dimension between the pallet supporting shelf crosspieces.

To achieve the above-mentioned object, the present invention provides a pallet carry-in management system for a three-dimensional storehouse for carrying-in/out pallets to and from a plurality of pallet retaining shelves supported at plural vertical stages by pallet supporting shelf crosspieces located on both sides of the shelves in a shelf frame, by use of at least one crane controlled by a computer, which comprises: a pallet presence/absence state management section for managing pallet presence or absence status of the respective pallet retaining shelves; a vertically continuous vacant shelf management section for managing a position and the number of stages of the vacant pallet retaining shelves on which no pallets are carried-in vertically continuously, on the basis of management information transmitted by said pallet presence/absence state management section; and a maximum allowable load height calculating section for calculating an maximum allowable height of loads to be mounted on the vacant pallet retaining shelves, on the basis of the position and number of stages of the vacant pallet retaining shelf information transmitted by said vertically continuous vacant shelf management section, in order to carry-in the pallet, on which loads whose height extends to a plurality of stages of the pallet retaining shelves are mounted, on a lowermost pallet retaining shelf of the vertically continuous vacant shelves, on the basis of the vertically continuous vacant shelf information given by said vertically continuous vacant pallet retaining shelf management section and the maximum allowable load height information given by said maximum allowable load height calculating section.

Further, said pallet presence/absence state management section, said vertically continuous vacant shelf management section, and said maximum allowable load height calculating section are all incorporated in a cell computer for controlling a pallet carry stacker crane for carrying-in/out the pallets.

In the pallet carry-in management system according to the present invention, since the presence or absence status of the respective pallet retaining shelves can be managed by the pallet presence/absence state management section; since a position and the number of stages of the vertically continuous vacant pallet retaining shelves (on which no pallets are carried-in vertically continuously) can be managed by a vertically continuous vacant shelf management section on the basis of management information transmitted by the pallet presence/absence state management section; and further since an maximum allowable height of loads to be mounted on the vacant pallet retaining shelves can be calculated by a maximum allowable load height calculating section on the basis of the position and number of stages of the vacant pallet retaining shelf information transmitted by the vertically continuous vacant shelf management section, it is possible to carry-in the pallet (on which tall loads whose height extends to a plurality of stages of the pallet retaining shelves can be mounted) on a lowermost pallet retaining shelf of the vertically continuous vacant shelves, on the basis of the vertically continuous vacant shelf information given by the vertically continuous vacant pallet retaining shelf management section and the maximum allowable load height information given by the maximum allowable load height calculating section.

DETAILED DESCRIPTION OF THE EMBODIMENTS

The embodiment of the pallet carry-in management system according to the present invention will be described hereinbelow with reference to the attached drawings.

Figure 1:
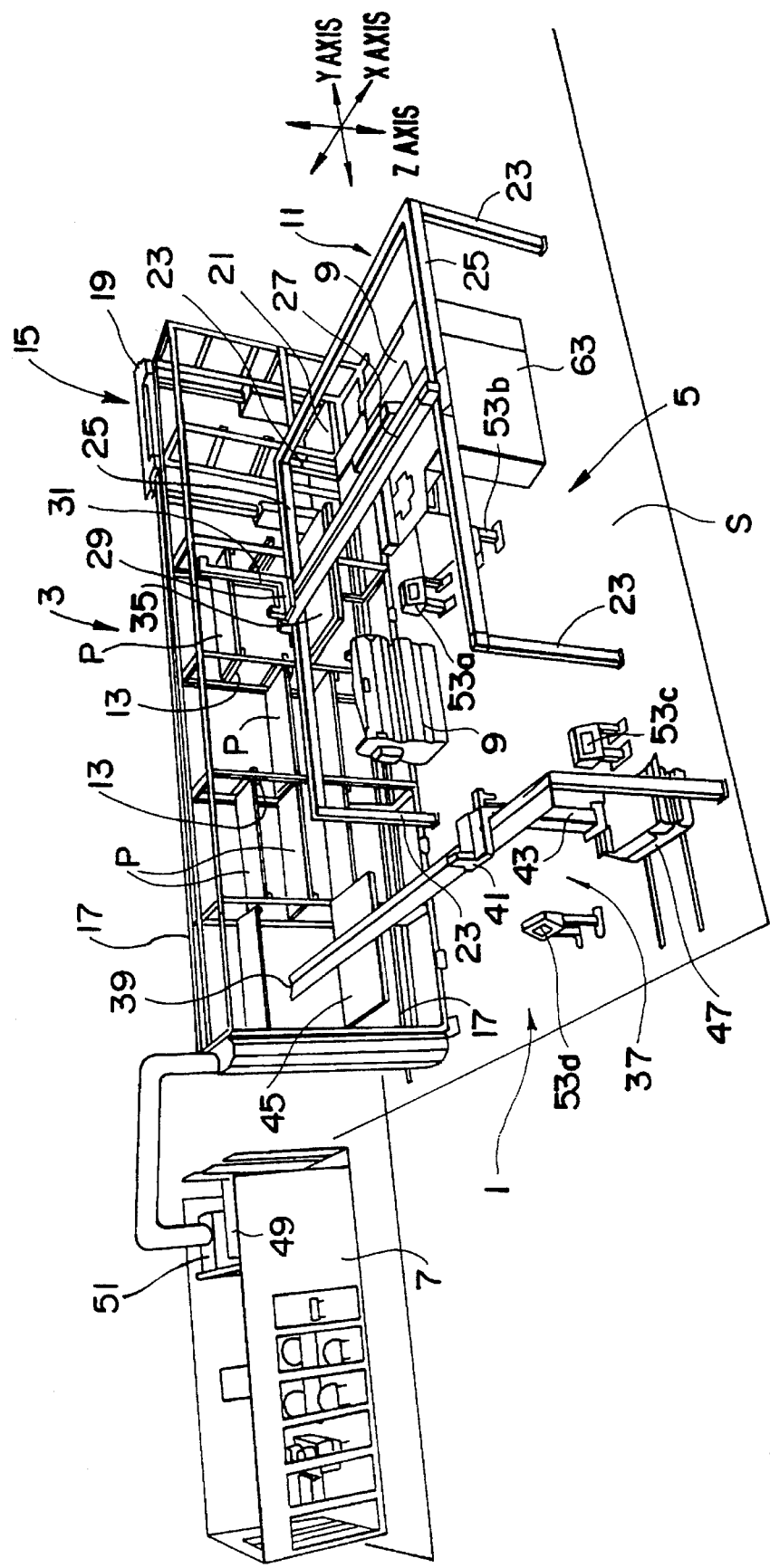
FIG. 1 is a perspective view showing the overall construction of the sheet material processing system including a three-dimensional storehouse, to which the pallet carry-in management system according to the present invention is applied.

FIG. 1 shows an example of a sheet material processing system, to which the pallet carry-in management system according to the present invention is applied. In this sheet material processing system, on a factory floor 1 there are arranged a three-dimensional shelf frame 3 as a three-dimensional storehouse, a rectangular sheet material processing area 5 provided in front of the shelf frame 3, and an appropriate management room 7 such as a production control room, a computer room, an office room, etc.

In the sheet material processing area 5, various sheet material processing machines 9 such as a turret punch press, a shearing machine, a press brake, etc. are arranged at a number of points appropriately. In addition, an aerial gantry robot 11 is also disposed as an areal carrying apparatus in the sheet material processing area 5.

Figure 4:
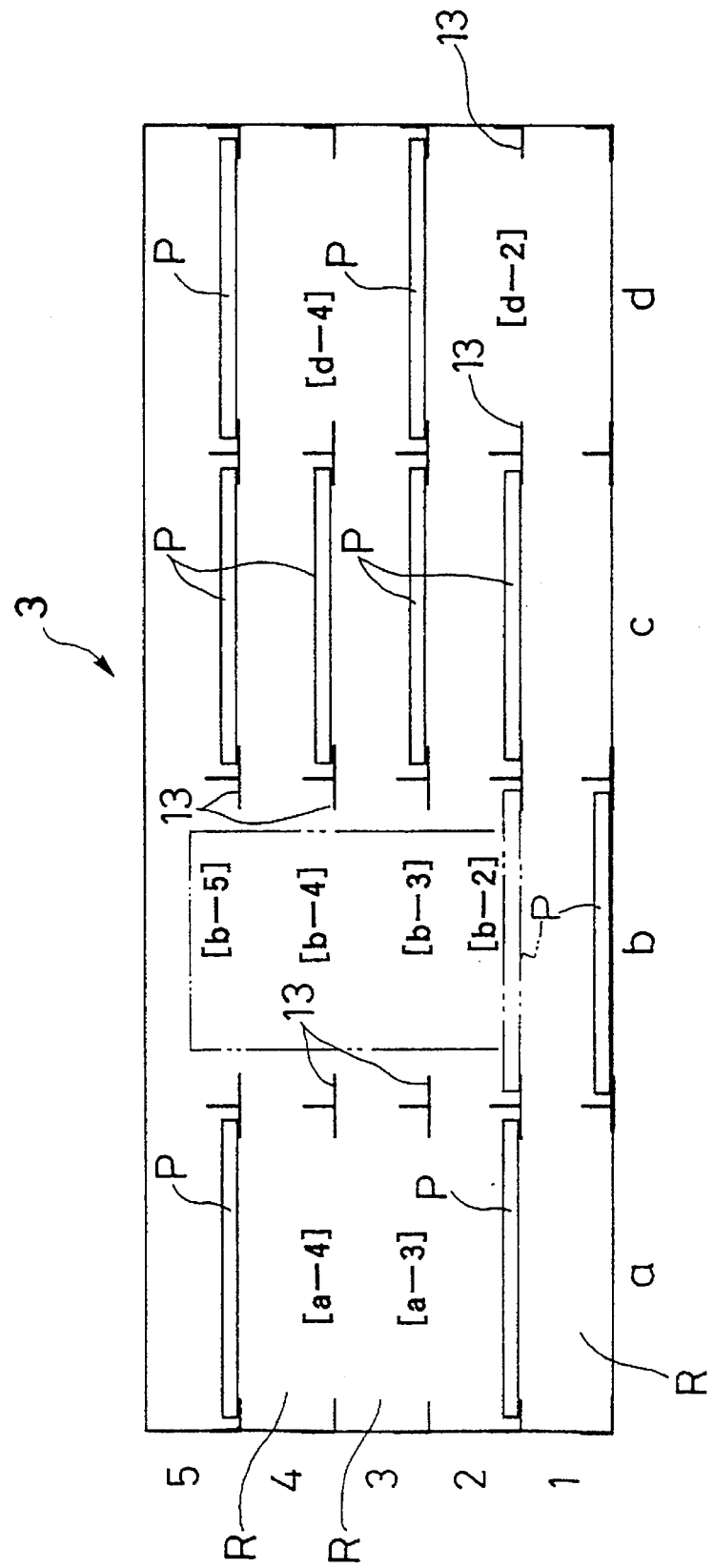
FIG. 4 is a front view showing an example of the arrangement of pallet supporting shelves in the pallet carry-in management system according to the present invention.

In the shelf frame 3, as depicted by a front view shown in FIG. 4, a plurality of pallet retaining shelves R are formed at plural vertical stages (extending in the vertical direction) and in plural lines (extending in the horizontal direction), by arranging a plurality of rail-shaped pallet supporting shelf crosspieces 13 extending in the X-axis direction (in FIG. 1) at intervals in both the Y- and Z-axis directions (in FIG. 1). To the respective pallet retaining shelves R, respective pallets P can be carried in and out where necessary. Therefore, when no pallet P is mounted on the pallet retaining shelf R, a vertically continuous vacant space can be formed extending in the vertical direction as shown by dot-dot-dashed lines in FIG. 4. Further, on the pallets P, various products before and after processed by the plate material processing machines 9 are mounted on stacked conditions. Further, in this embodiment, various tools such as dies, jigs, etc. used with the plate material processing machines 9, various hand devices used with the aerial gantry robot 11 are also stored in the shelf frame 3, in addition to the products before and after processed by the machines 9. In other words, dies, jigs, etc. used with the plate material processing machines 9 and robot hands used with the aerial gantry robot 11 can be mounted on the various pallets P supported by the pallet supporting shelf crosspieces 13 of the shelf frame 3, respectively, in addition to plate materials and products processed by the plate material processing machines 9.

Further, in back of the shelf frame 3, a pallet carrying stacker crane 15 for carrying the pallets P to and from the respective pallet retaining shelves R is installed. The structure of the pallet carrying stacker crane 15 is well known. That is, stacker crane 15 includes a travel frame body 19 which can travel in the extending direction of the shelf frame 3 by guidance along two upper and lower guide rails 17 extending in the right and left (Y-axis) direction in FIG. 1, and an elevator bed 21 mounted on the travel frame body 19 so as to be movable up and down. Although not shown, a tracker of known structure is also mounted on the elevator bed 21 to move the pallet P to and from the pallet retaining shelves R.

Figure 2:
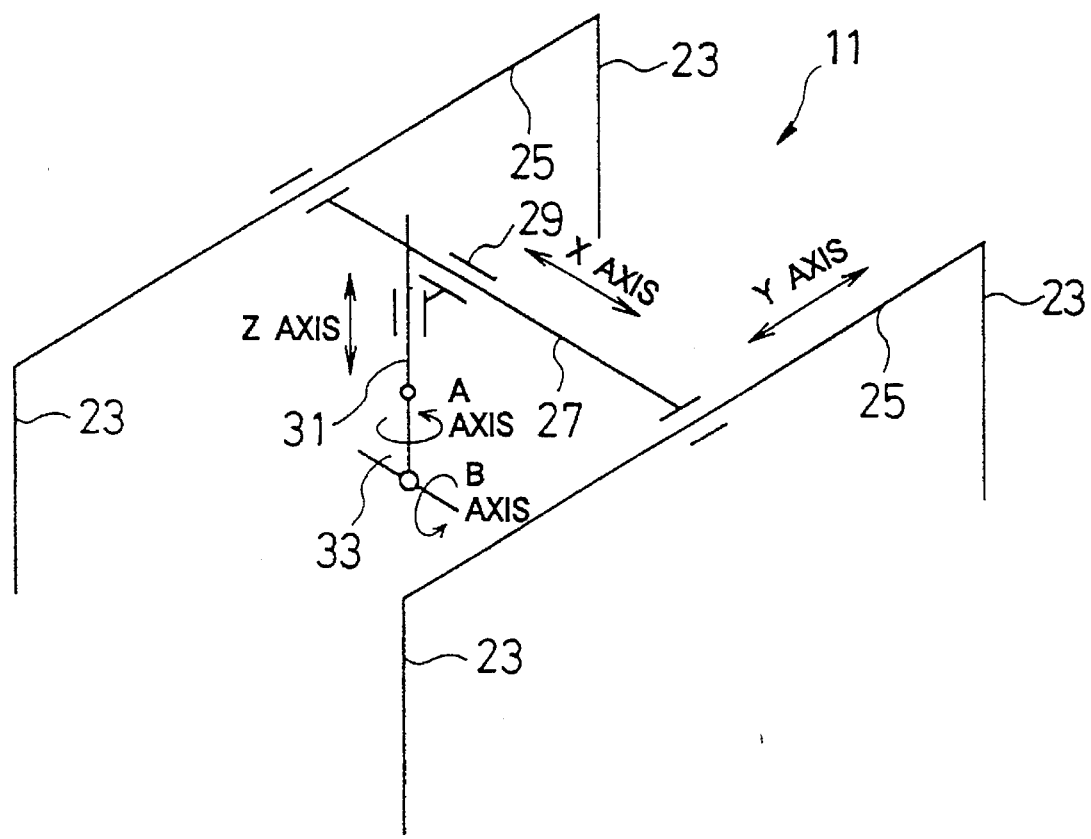
FIG. 2 is a skeletal diagram showing an example of a rectangular coordinate system robot used for the plate material processing system.

The aerial gantry robot 11 is a rectangular coordinate system robot movable two dimensionally. As shown in FIG. 2, the aerial gantry robot 11 is of 5-axis rectangular coordinate system robot provided with a pair of travel guide beams (extending along the Y axis) 25, a travel beam (extending along the X-axis) 27, a slider 29 movable along the travel beam 27, a vertical arm (extending along the Z-axis) 31, a robot arm (pivotal around both A- and B-axes, respectively) 33. In more detail, the two travel guide beams 25 extend in parallel to each other in the Y-axis direction and supported by four posts 23 stood on the respective corners of the plate material processing area 5. The travel beams 27 is bridged between the two travel guide rails 25 and further movable to and fro in the Y-axis direction along the travel guide beams 25. The slider 29 is supported by the travel beam 27 and movable to and fro in the X-axis direction along the travel beam 29. The vertical arm 31 is direction. The robot arm 33 is attached to an end of the vertical arm 31 so as to be pivotal around a vertical (A) axis and further around a horizontal (B) axis, as shown in FIG. 2.

Further, the robot hand (not shown) for clamping various goods to be stored on the pallets P is exchangeably attached to an end of the robot arm 33. That is, since the robot hand attached to the end of the robot arm 33 is exchanged with another one according to the goods to be clamped, various robot hands for exchange are stored on the pallet P supported by the pallet supporting shelf crosspieces 13 for forming the pallet retaining shelves R of the shelf frame 3.

The travel beam 27 of the aerial gantry robot 11 is located at a position higher than the plate material processing machines 9 arranged in the plate material processing area 5. Therefore, the robot hand (not shown) attached to the robot arm 33 can be freely moved in the two dimensional (X- and Y-axes) directions within the plate material processing area 5 in a space higher than the plate material processing machines 9. That is, the aerial gantry robot 11 is of bridge type composed of the travel guide beams 25, the travel beams 27, the slider 29, and the vertical arm 31. Further, the height at which the robot hand is moved is determined to be higher than that of the plate material processing machines 9.

Further, a pallet transfer station 35 is provided at a predetermined stage of the shelf frame 3 so as to extend frontward into the plate material processing area 5. This pallet transfer station 35 is an aerial station located at a relatively higher stage of the shelf frame 3 so as to match the height level at which the robot hand (not shown) of the aerial gantry robot 11 is movable. Therefore, the pallet P supported by the pallet supporting shelf crosspieces 13 arranged at the height the same as that of the pallet transfer station 35 can be transferred to the pallet transfer station 35 by a tracker (not shown) mounted on the elevator base 21 of the pallet carry stacker crane 15.

In this case, a pallet P or goods such a die or a jig mounted on a pallet carried to the pallet transfer station 35 are clamped by the robot hand attached to the end of the robot arm 33, and further carried from the pallet transfer station 35 to an appropriate position over a plate material processing machines 9 arranged in the plate material processing area 5 in a shortest possible distance in midair.

Further, in the embodiment shown In FIG. 1, a linear gantry robot 37 is installed in addition to the aerial gantry robot 11 outside the plate material processing area 5. This linear gantry robot 37 is of 4-axis linear shuttle type robot. This linear gantry robot 37 is composed of a ceiling rail 39, a slider 41 movable to and fro in the X-axis direction along the ceiling rail 39, a vertical arm 43 attached to the slider 41 so as to be movable in the vertical (Z-axis) direction, and a robot arm (not shown) attached to the vertical arm 43 so as to be pivotal in both a vertical axis and a horizontal axis, in the same way as with the case of the aerial gantry robot 11.

This linear gantry robot 37 carrys the goods to be stored between another pallet transfer station 45 (the left side in FIG. 1) provided in the same shelf frame 3 and an additional device 47 appropriately arranged on the factory floor 1.

Figure 3:
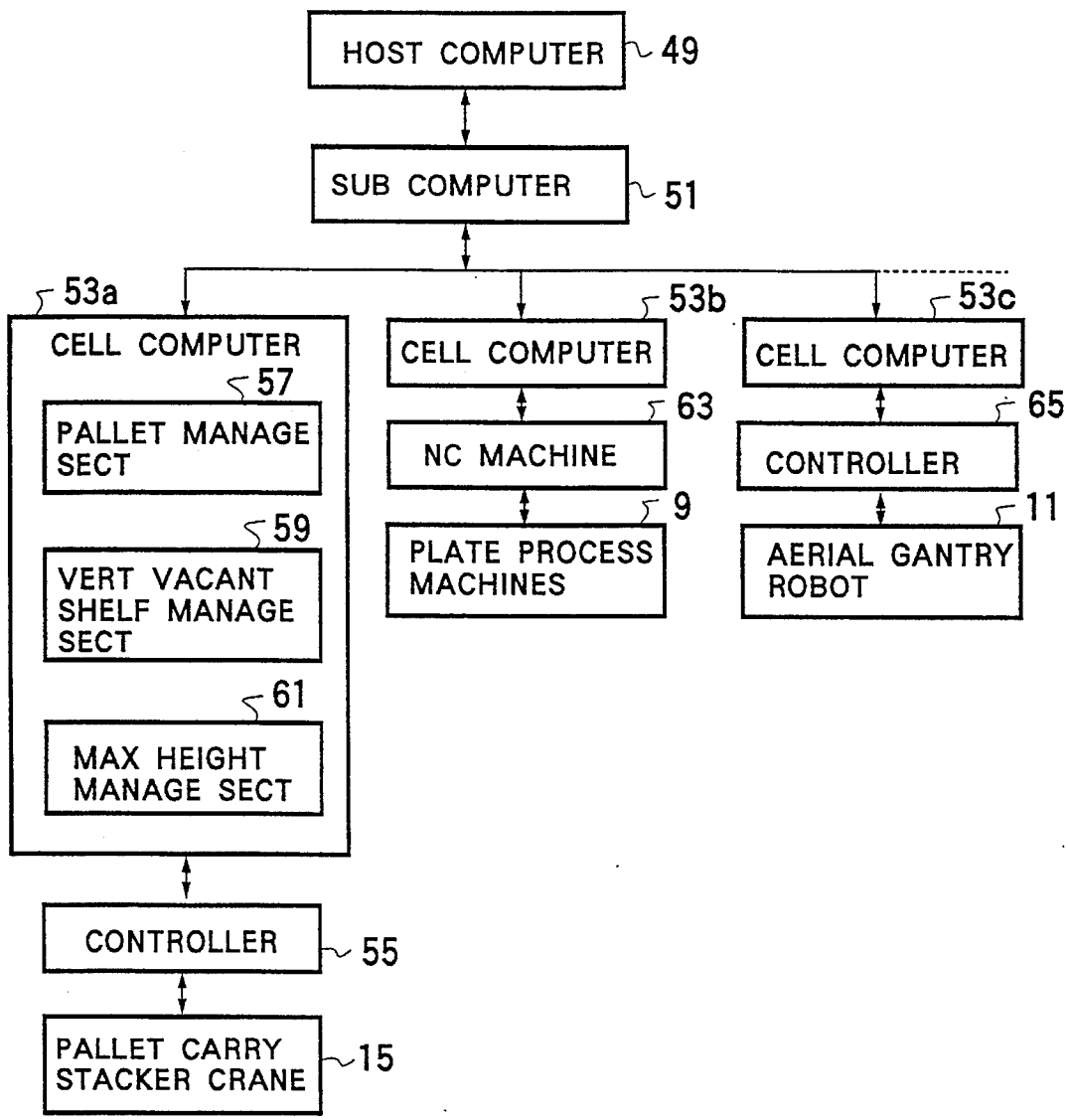
FIG. 3 is a block diagram showing a control system for a sheet material processing system including the pallet carry-in management system for a three-dimensional storehouse according to the present invention.

As shown in FIG. 3, in the management room 7, a host computer 49 and a sub-computer 51 are installed. To this sub-computer 51, a plurality of cell computers 53a, 53b and 53c, . . . installed on the factory floor 1 are connected for communications with one another.

The host computer 49 manages various items related to the factory, for instance such as the processing of orders received by the users, the production planes per month or week, the stocks of materials and products, the order of necessary parts, the cost prices of the parts and materials, the distributions of the parts and materials, etc.; further transmits other information necessary for production such as production technique information (e.g., tool information, work information, setup information, and other information), etc. to the sub-computer 51; and further receives actual information related to the production from the sub-computer 51.

The sub-computer 51 manages a plurality of cell computers 53a, 53b, 53c, . . . collectively, by receiving the production plane information and the necessary production technique information from the host computer 49; by transmitting the necessary information (e.g., tool information, work information, setup information, processing knowhow information, processing program information, other respective information) corresponding to the respective production planes to the respective cell computers 53a, 53b, 53c, . . . ; by receiving the actual production information from the respective cell computers 53a, 53b, 53c, . . . for actual production management; and further by transmitting the same information to the host computer 49.

Here, the cell computers 53a, 53b, 53c, . . . are terminal units provided separately for the respective objects to be controlled such as the plate material processing machines 9, the aerial gantry robot 11, the pallet carry stacker crane 15, the linear gantry robot 37, etc.

For instance, the cell computer 53a outputs control commands to a controller 55 of the pallet carry stacker crane 15 on the basis of pallet carry information supplied by the sub-computer 51, in order to manage the control of the pallet carry stacker crane 15 and the pallet management of the shelf frame 3 and to transmit various pallet information stored in the pallet retaining shelves R at the respective stages of the shelf frame 3 and various goods information mounted on the respective pallets P to the sub-computer 51. Further, the cell computer 53a includes a pallet presence/absence state management section 57, a vertically continuous vacant shelf managing section 59, and a maximum allowable load height calculating section 61 as a pallet carry management system.

The pallet presence/absence state management section 57 manages the presence or absence of the pallets P on the respective pallet retaining shelves R on the basis of the actual pallet carry-in/out information of the pallet carry stacker crane 15. In more detail, an address is allocated to each of the respective pallet retaining shelves R of the shelf frame 3. For instance, as shown in FIG. 4, the respective stages can be represented by addresses 1, 2, 3, . . . and the respective vertical lines can be represented by addresses a, b, c, . . . , so that it is possible to indicate the presence or absence of each pallet P on the pallet retaining shelves R on the basis of an address (e.g., 3-b). The data map indicative of the presence or absence of the pallets P on the respective retaining shelves R is stored in the pallet presence/absence state management section 57.

The vertically continuous vacant shelf management section 59 stores and manages the stage addresses of vacant pallet retaining shelves R (at which no pallets P are carried-in on the respective pallet retaining shelves R continuously in the vertical direction) and the number of the stages of the vacant pallet retaining shelves R, on the basis of the management information given by the pallet presence/absence state management section 57, that is, the pallet data map.

The maximum allowable load height calculating section 61 calculates the maximum allowable height of the load mountable on the vacant pallet retaining shelves R on the basis of the stage information of the vacant pallet retaining shelves R given by the vertically continuous vacant shelf management section 59. In this calculation, when the vertical distance (i.e., vertical pitch) between the pallet supporting crosspieces is the same in the respective pallet retaining shelves R, the maximum allowable load height calculating section 61 calculates the actual maximum allowable load height by multiplying the pitch (the maximum allowable load height of one pallet retaining shelf R) by the number of stages of the vacant pallet retaining shelves R.

Further, without being limited to only the above-mentioned calculating method, the maximum allowable load height can be calculated by multiplying a value (obtained by subtracting one from the number of the stages of the vacant pallet retaining shelves R) by the vertical pitch of the pallet supporting shelf crosspieces 13 and further by adding the maximum allowable load height of one pallet retaining shelf to the multiplied value.

The vertically continuous vacant shelf information of the vertically continuous vacant pallet retaining shelf management section 59 and the maximum allowable load height information of the maximum allowable load height calculating section 61 are both transmitted to the sub-computer 51.

The cell computer 53b executes the processing program of the NC machine 63 (as one of the plate material processing machines 9) by switching NC data on the basis of the processing schedule information supplied by the sub-computer 51, and further transmits the actual information of the NC machine 63 to the sub-computer 51.

The cell computer 53c outputs the control commands to the controller 65 on the basis of the aerial gantry robot control information supplied by the sub-computer 51 to control the aerial gantry robot 11.

The operation of the pallet carry management system as constructed above will be described hereinbelow.

The presence or absence of the pallet P on the respective pallet retaining shelves R is written in the data map stored in the pallet presence/absence management section 57, on the basis of the actual pallet carry-in/out data for each pallet retaining shelves R by the pallet carry stacker crane 15. On the basis of the data map of the pallet presence/absence state management section 57, the vertically continuous vacant shelf management section 59 retrieves the vacant pallet retaining shelves R to which no pallets P are carried-in continuously in the vertical direction in the respective pallet retaining shelves R, and stores the addresses and the number of the stages of these vacant pallet retaining shelves R.

For instance, in FIG. 4, the vertically continuous vacant shelves R are at the addresses of [a-3]; [b-2], [b-3] and [b-4]; and [d-1], respectively. Further, the number of vacant stages is 2 in the pallet retaining shelf R at the address [a-3]; 4 in the pallet retaining shelf R at the address [b-2], 3 in the pallet retaining shelf R at the address [b-3], 2 in the pallet retaining shelf R at the address [b-4]; and 2 in the pallet retaining shelf R at the address [d-1], respectively.

On the basis of the stage number information of the continuous vacant pallet retaining shelves R as described above, the maximum allowable load height calculating section 61 calculates the maximum allowable load height of the respective pallet retaining shelves R. For instance, in the pallet retaining shelf R of the address [a-3], since the number of vacant stages is 2, the maximum allowable load height of the pallet retaining shelf R at the address [a-3] is determined to be twice as higher as that of the single pallet retaining shelf R. Further, in the pallet retaining shelf R of the address [b-2], since the number of vacant stages is 4, the maximum allowable load height of the pallet retaining shelf R at the address [b-2] is determined to be 4 times as higher as that of the single pallet retaining shelf R.

The vertically continuous vacant shelf information of the vertically continuous vacant pallet retaining shelf management section 59 and the maximum allowable load height information of the maximum allowable load height calculating section 61 are both transmitted to the sub-computer 51, so that it is possible to carry-in the pallets P, on which tall loads (whose height extends to a plurality of vertical stages of the pallet retaining shelves R) can be mounted, to the lowermost pallet retaining shelf R (e.g., at the address [a-3] or [b-2]) of the vertically continuous vacant shelves R. In more detail, in the case of the pallet retaining shelf R of the address [b-2], it is possible to carry-in a pallet P on which tall loads (whose height extends up to the higher pallets corresponding to the addresses [b-3], [b-4] and [b-5]) have been mounted. Further, it is of course possible to carry-in the pallet P on which loads (whose height is lower than the maximum allowable height) have been mounted.

As understood by the above-mentioned embodiment, in the pallet carry-in management system for a three-dimensional storehouse according to the present invention, since the maximum allowable height of the loads mounted on the pallet P can be determined without being limited to only the one pitch dimension of the pallet supporting shelf crosspieces, it is possible to carry-in the pallet P on which tall loads (whose height extends to a plurality of the vertical stages) are mounted on the lowermost pallet retaining shelf of the vertically continuous vacant shelves; that is, it is possible to store tall goods automatically, irrespective of the one pitch of the pallet supporting shelf crosspieces.

What is claimed is:

1. A pallet carry-in management system for a three-dimensional storehouse for carrying in/out pallets to and from a plurality of pallet retaining shelves supported at plural vertical stages by pallet supporting shelf crosspieces located on both sides of the shelves in a shelf frame, by use of at least one crane controlled by a computer, comprising:

a pallet presence/absence state management section for managing pallet presence or absence status of the respective pallet retaining shelves;

a vertically continuous vacant shelf management section for managing a position and a number of stages of vacant ones of said pallet retaining shelves which remain vertically continuously vacant, on the basis of management information transmitted by said pallet presence/absence state management section; and a maximum allowable load height calculating section for calculating a maximum allowable height of loads to be mounted on the vacant pallet retaining shelves, on the basis of the position and number of stages of the vacant pallet retaining shelf information transmitted by said vertically continuous vacant shelf management section, in order to carry-in the pallet, on which loads whose height extends to a plurality of stages of the pallet retaining shelves can be mounted, on a lowermost pallet retaining shelf of the vertically continuous vacant shelves, on the basis of the vertically continuous vacant shelf information given by said vertically continuous vacant pallet retaining shelf management section and the maximum allowable load height information given by said maximum allowable load height calculating section.

2. The pallet carry-in management system of claim 1, wherein said pallet presence/absence state management section, said vertically continuous vacant shelf management section, and said maximum allowable load height calculating section are all incorporated in a cell computer for controlling a pallet carry stacker crane for carrying-in/out the pallets.

* * * * *

UNITED STATES PATENT AND TRADEMARK OFFICE
CERTIFICATE OF CORRECTION

PATENT NO. : 5,475,604
DATED : December 12, 1995
INVENTOR(S) : Eiji NAGAMATSU

It is certified that error appears in the above-indentified patent and that said Letters Patent is hereby corrected as shown below:

On the cover, in section [56], "References Cited", "FOREIGN PATENT DOCUMENTS", line 6, change "9407776" to ----94-07776---.

Signed and Sealed this

Twelfth Day of November, 1996

Attest:

BRUCE LEHMAN

Attesting Officer     Commissioner of Patents and Trademarks